Dec. 11, 1945.   J. P. STAPLES   2,390,561
SEALING CONTAINER
Filed June 27, 1942

Inventor
J. P. STAPLES

By Olen E. Bee
Attorney

Patented Dec. 11, 1945

2,390,561

UNITED STATES PATENT OFFICE 2,390,561

SEALING CONTAINER

Julian P. Staples, Mount Lebanon, Pa., assignor to Pittsburgh Corning Corporation, Allegheny County, Pa., a corporation of Pennsylvania Application June 27, 1942, Serial No. 448,746

2 Claims. (Cl. 215—43)

The present invention relates to caulking or gasketing systems for use in the joints between composite bodies comprising a plurality of rigid parts secured together in abutting or overlapping relationship and it has particular relation to a system suitable for use between the screw threaded rim portions of glass containers and the screw threaded closures therefor, to provide a seal between the overlapping surfaces.

One object of the invention is to provide a gasketing composition that can be adhered to one member in a joint and which will yield or distort sufficiently to compensate for irregularities in the surface and to allow for inequalities due to thermal expansion, or contraction of the parts.

A second object is to provide a composition that will adhere to one element of a joint without adherence to the other and which will still deform to the contours and relative movements of the non-adhering surface and thus provide a satisfactory seal.

A third object is to provide a new gasketing material satisfactory for use in place of rubber, cork and the like.

A fourth object is to provide a gasketing material which can be spread as a relatively thin and economical adherent layer upon the threads of a screw cap container, and which will provide a perfect seal between the threads without actually bonding to the surfaces of the container.

These and other objects of the invention will be apparent from consideration of the following specification and the appended claims.

It has heretofore been customary to seal joints in composite bodies composed of a plurality of rigid parts, by means of gaskets of highly springy material, such as cork or rubber. The common glass container for example has customarily been closed by screw cap or crimped cap stamped from sheet metal and having a ring or an insert of rubber or cork providing a yieldable bearing member between the glass and the metal entirely around the opening of the container. Metals for caps, at least under present day conditions, are expensive if not impossible to obtain and they are also subject to corrosion and are not very durable. Moreover, they may contaminate or cause deterioration of the contents of the container. Likewise rubber and cork sealing rings and inserts for the caps are now very difficult to obtain and usually are but short lived.

It has heretofore been proposed to substitute glass caps for metal caps for containers, thus saving valuable metal and obviating corrosion. However, this within itself does not eliminate the necessity of inserts and rings for sealing purposes. Furthermore, the contacting of glass threads of a glass cap with similar threads of a glass container would be highly objectionable because friction would not be sufficiently great to obviate slippage. Chipping or breaking of the threads, due to jars or to unequal thermal adjustments, would be likely. These problems have not heretofore been solved and the elimination of metal caps and rubber or cork sealing members for glass containers has not heretofore been obtained.

The use of plastics as sealing elements possibly might suggest itself for the purpose. Possibly it might be suggested to coat the threads of the container or the closure element with a solution of plastic, which would adhere to the parts, when the cap is screwed down, thus providing a complete and perfect seal. However, in actual practice such system is not satisfactory, because the parts are permanently cemented or bonded together and it would be impossible to remove the closure without breaking the glass. Moreover, the solvents are likely to contaminate the products, such as food products. If it were proposed to apply the plastics to the threads as solutions and then to evaporate the solvents, difficulty would be experienced, because practically all of the plastics which would be possible for use as sealing media are relatively hard, rigid and incompressible so that they would not yield without cutting by the threads to follow small irregularities in the surfaces to be sealed, which irregularities are of course impossible to obviate in a cheap commercial product, such as a glass container.

The present invention involves the use as a sealing medium between overlapping solid surfaces, such as the caps for mouths of containers, of porous plastic composition in which the pores provide for internal displacement of the plastic when pressure is applied, and also imparts a certain degree of compressibility and spring or resilience to the plastic, thus insuring that it can be deformed sufficiently to allow the cap to pass over the mouth of the container, even though the diameter of the inner surface of the plastic is somewhat less than the outer diameter of the mouth.

A convenient method of forming such porous plastic composition upon a surface is illustrated in Jordan patent application Serial No. 375,551, filed January 23, 1941 now Patent No. 2,333,723. The same procedure can be applied to the deposition of gasket coatings in jar caps or the like. According to this method a highly concentrated viscous solution of a plastic is prepared by dissolving such plastics as vinyl acetate, vinyl acetal, or a copolymer of vinyl acetate and vinyl chloride or even vinyl chloride in a volatile solvent, such as ethyl alcohol or acetone. A solution of a concentration of 25 to 30 percent solids is satisfactory for the purpose. In order to obtain high concentration of solids and low viscosity for spraying the solution should be heated. For example, a 25 or 30 percent solution of polyvinyl butyral resin operates satisfactorily in a spray gun at a temperature of about 165° F. Other plastics may require slightly higher or lower temperatures. Plasticizers, such as diethyl or dibutyl phthalate, diethylene glycol, dihexoate and the like, may be included. For example, polyvinyl butyrate may include 22 to 35 percent of diethylene dihexoate. The lower percentages will give a harder, more heat-resistant coating.

The hot solutions are sprayed onto one or more of the surfaces between which a seal is desired, and due to the temperature of the solution much of the alcohol flashes into vapor almost immediately upon leaving the spray gun. It is probable that some of these vapors are entrapped in the film of plastic as it is formed. Likewise some of the air employed as a spreading medium may be entrapped. In any event, the plastic as it is laid down is filled with minute bubbles and the plastic medium immediately becomes so viscous that the bubbles can not escape. The degree of porosity and fineness of the pores may be increased by forced drying of the film. The shorter the period of drying for a given resin solution, the more pronounced these properties will be. Consequently it may be desirable to bake the partially dried films at a moderate temperature, or to dry under vacuum.

A layer of plastic sufficient to fill the space between the cap and mouth of the container and to accommodate for any irregularities between the surfaces is deposited in this manner. Usually a thickness will be within a range of about 1 to 20 thousandths of an inch, though greater or lesser thickness may be deposited to meet special requirements.

The plastic, as laid down, might be somewhat adherent in nature, even when dried and might possibly act as a bond to cement both of the overlapping surfaces together in permanent relationship. This of course would be highly objectionable in the case of glass containers having glass or metal caps. In accordance with the present invention it is proposed to obviate any such effect by dusting the surface of the plastic while it still contains a small amount of solvent. Suitable dusting agents comprise any of the common pigmentary materials. Among them may be included finely-divided calcium carbonate, such as may be obtained by chemical precipitation, bentonite, flake aluminum, graphite, carbon black and many others. The powder or pigment will adhere as a thin layer to the plastic tacky surface and will render it permanently non-adhesive with respect to the glass or other surface with which it may later be brought into contact. It is contemplated that some plastics, such as vinyl chloride will be non-tacky with respect to glass when hardened and will not require pigment coating.

If it is desired to increase the moisture resistance of the bond between the surface and a porous vinyl polymer layer (e. g. vinyl chloride or vinyl chloride-acetate or vinyl acetate layer) which is spread upon the surface, the surface may first be coated with a suitable medium, such as hydrolyzed ethyl silicate, or a mixture of 10 parts hydrolyzed ethyl silicate, 10 parts vinyl acetate, 80 parts ethyl alcohol, which bonds readily to glass and also will bond to many of the plastics including vinyl acetal, vinyl acetate, vinyl chloride and copolymer resins of vinyl acetate and vinyl chloride. Alcohol or acetone solutions of these may be sprayed onto the ethyl silicate coated glass while hot and will flash into a cellulated layer of sufficient rigidity to retain the gaseous bubbles permanently entrapped. Of course many of the plastics including vinyl butyrate, vinyl acetate, methyl methacrylate and others are inherently adhesive to glass and similar materials and do not require the use of an additional adhesive.

Vinyl plastics are especially satisfactory for use in the present invention because they are inert and non-poisonous. They are, also, highly thermoplastic, so that they set to solid non-tacky state immediately upon cooling and reduction of solvent content. However, vinyl plastics are not always required. Other plastics including "Thiokol" and such cellulosic plastics as nitrocellulose and cellulose acetate may be sprayed upon the caps to provide cellular gasket layers. The bond of these may be increased by means of a sizing coat of gelatin or the like spread directly upon the glass.

Drying oils, such as tung oil, linseed oil and the like may also be employed to size the surface for the reception of porous layers of alkyd resins, phenol-formaldehyde resins, urea-formaldehyde resins and the like. These of course should be employed in an intermediate or soluble stage of polymerization. The resins may be further cured by baking after application.

In case the containers are to be subjected to considerable heat as for instance in cooking or sterilizing operations and the plastic is of low melting point, it may be desirable to add thereto considerable amounts of pigments, such as titanium dioxide, calcium carbonate, carbon black, etc., which will greatly retard any tendency of the resin to flow. Particular reference has been made to the application and formation of cellular plastic sealing coatings by spraying the plastic. However, other methods are also contemplated. For example, the closures might be partially or completely dipped in a hot, concentrated solution of plastic under pressure. By suddenly releasing the pressure, the coating would be bloated.

Also the plastic solutions might be mixed with gassing agents, such as ammonium carbonate and applied by brushing or dipping. If the film were then baked before it became completely solidified carbon dioxide bubbles would be released in the film to give a cellular product.

Embodiments of the invention are illustrated in the drawing in which

Figure 1:
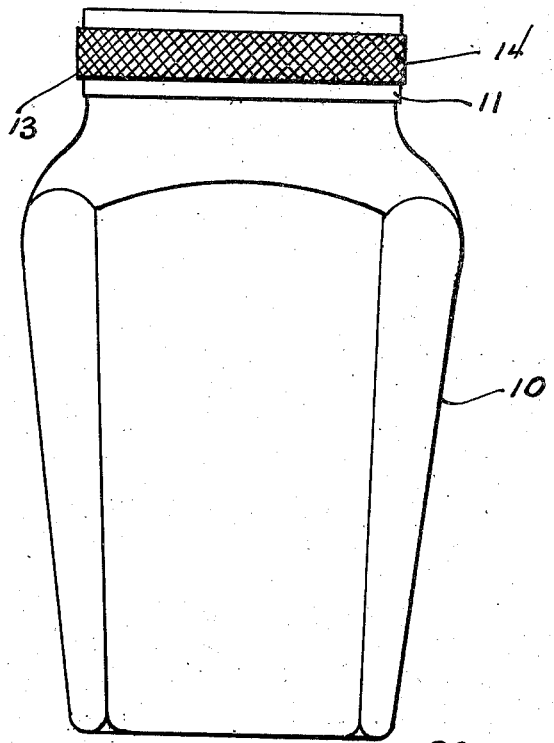
Fig. 1 is an elevational view of a container having a glass top constructed in accordance with the provisions of the present invention.
Figure 2:
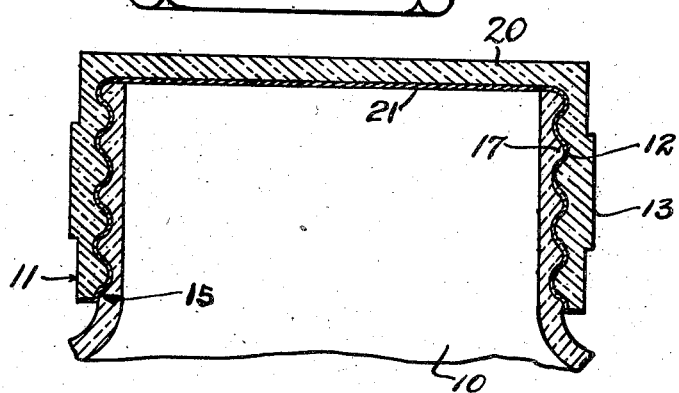
Fig. 2 is a fragmentary sectional view of a container with a glass top suitable for use in the practice of the invention.
Figure 3:
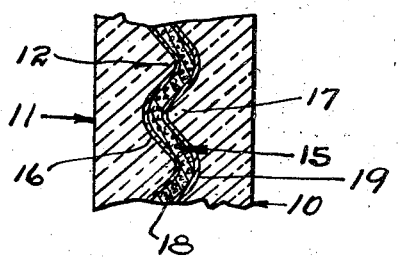
Fig. 3 is a fragmentary sectional view showing on a larger scale a portion of the top which has been treated in accordance with the provisions of the invention and a mating section of the container.

In the drawing, a glass container or jar 10 of any convenient form is provided with a cap 11 preferably formed of glass and having internal threads 12 as shown in Fig. 2. The top may have a band 13 scored or checked as indicated at 14, in order to permit it to be gripped firmly for purposes of unscrewing or tightening it. This cap is provided with an inner lining 15 which, optionally, may include a size or bonding coat 16 directly adherent to the surface of the glass and consisting of ethyl silicate, gelatin, drying oil or the like dependent upon the composition of sealing layer subsequently to be applied.

The threads 12 engage corresponding threads 17 about the tubular mouth of the jar, but preferably the inner diameter of the cap is sufficiently greater than the outer diameter of the top of the jar, to tolerate any reasonable degree of distortion of interfitting parts, and also to leave space for a layer 18 of cellular plastic. The layer—while uncompressed—should be slightly greater in thickness than the space between the surfaces. It should have sufficient porosity or cellularity that it can pack down or compress when the cap is applied to allow the threads to mesh without the plastic actually being cut, and without imposing excessive pressure between the parts. Probably a percentage of voids of from about 30 to 75 percent will be satisfactory. The cells are usually quite small in diameter, even microscopic, so that several occur in any given thickness of the coating.

The layer 18 preferably is applied by spraying a concentrated and hot solution of one of the plastics herein enumerated, but other methods may be employed. The plastic by nature is practically incompressible, but by reason of the cells in it the film is readily compressible and has sufficient spring or elasticity to follow any reasonable irregularity in the parts and to compensate for expansion or contraction of the parts with thermal changes.

Layer 19 is a pigmentary material applied by dusting or rubbing to render the layer 18 non-adherent with respect to the top of the jar. If the plastic in layer 18 is inherently non-adhesive it will not be required.

With a glass container and a glass cap it is of course necessary that a layer of plastic be disposed between the threads. However, it is also possible to coat the lower face of the top 20 of the cap to provide in effect an insert 21, which, when the cap is screwed down, is engaged by the top edge of the jar as shown in Fig. 2, thus providing an additional seal. The porous layer may be applied either to the cap or to the jar, or to both, though the latter is seldom necessary.

It will be apparent that the sealing layer herein disclosed is inexpensive to apply both from the standpoint of labor and the quantities of material required. No highly strategic materials are required, and the coatings are not subject to rapid deterioration. The overlapping parts are adequately cushioned from each other and the possibility of the closures and the mouths of the containers being frozen together is obviated.

Particular reference has been made to glass containers and glass caps, since such system has heretofore been impracticable. However, metal may replace glass in either or both of them.

The forms of the invention herein described are to be regarded merely as exemplary. It will be apparent to those skilled in the art that numerous modifications may be made therein without departure from the spirit of the invention or the scope of the appended claims.

What I claim is:

1. The combination comprising a glass container formed with a tubular mouth element having a set of screw threads, a closure element for the mouth element, the closure element having a set of screw threads mating with the threads of the mouth element, one element constituting an internal part, the other an external part, the internal part being sufficiently smaller than the external part to leave a space between contiguous surfaces of the two, a sealing layer of cellular plastic containing about 30 to 75 percent of voids bonded to one of the sets of screw threads and being non-adherent with respect to the other set, said sealing layer when uncompressed being thicker than the space between said parts but being of a sufficiently cellular structure to permit it to yield to conform to the dimensions of the space to provide a seal when the closure element is screwed in place.

2. The combination comprising a glass container formed with a tubular mouth having a set of external screw threads, a glass cap for the mouth, the cap having a set of internal screw threads mating with the threads of the mouth, the cap being of greater internal diameter than the mouth to leave a slight space between the inner surface of the cap and the outer surface of the mouth, a sealing layer of plastic bonded to one of the sets of threads and being non-adherent with respect to the other set, said sealing layer when uncompressed being slightly thicker than the space between the surfaces but containing about 30 to 75 percent of voids to permit it to yield to conform to the dimensions of the space to provide a seal between the threads.

JULIAN P. STAPLES.